(12) United States Patent
Yoo

(10) Patent No.: US 10,688,605 B2
(45) Date of Patent: Jun. 23, 2020

(54) FIXING DEVICE FOR POSITION-ADJUSTING JIG

(71) Applicant: Jiyounglinsystem Co., Ltd., Incheon (KR)

(72) Inventor: Kwang Young Yoo, Incheon (KR)

(73) Assignee: Jiyounglinsystem Co., Ltd., Incheo (KR)

( * ) Notice: Subject to any disclaimer, the term of this patent is extended or adjusted under 35 U.S.C. 154(b) by 320 days.

(21) Appl. No.: 15/749,074

(22) PCT Filed: Jul. 13, 2016

(86) PCT No.: PCT/KR2016/007580
§ 371 (c)(1),
(2) Date: Jun. 5, 2018

(87) PCT Pub. No.: WO2017/026673
PCT Pub. Date: Feb. 16, 2017

(65) Prior Publication Data
US 2018/0281123 A1 Oct. 4, 2018

(30) Foreign Application Priority Data

Aug. 7, 2015 (KR) .................... 10-2015-0111743
Jun. 3, 2016 (KR) .................... 10-2016-0082463

(51) Int. Cl.
*B23K 37/04* (2006.01)
*B62D 65/02* (2006.01)

(52) U.S. Cl.
CPC .......... *B23K 37/0443* (2013.01); *B62D 65/02* (2013.01)

(58) Field of Classification Search
CPC ............... B23K 37/04; B23K 37/0443; B23K 37/0452; B23K 37/047; B23Q 3/18;
(Continued)

(56) References Cited

U.S. PATENT DOCUMENTS 3,288,978 A * 11/1966 Trygar ................. B23K 37/047
219/80
4,535,927 A * 8/1985 Matsubara ........... B23K 37/047
219/80
(Continued)

FOREIGN PATENT DOCUMENTS

JP          60-053493 U     4/1985
KR    10-2001-0114073 A    12/2001
(Continued)

*Primary Examiner* — Tyrone V Hall, Jr.
(74) *Attorney, Agent, or Firm* — Weitzman Law Offices, LLC

(57) ABSTRACT

The present invention provides a fixing device 1 for a position-adjusting jig, the fixing device 1 including: a driving cylinder 100 which includes a piston having a predetermined stroke; a jig-position-fixing unit 200 which is coupled to the piston of the driving cylinder 100; a guide block 300 which fixes and assists the jig-position-fixing unit 200 operated by the stroke of the piston of the driving cylinder 100; and a position-fixing bracket 400 which is coupled to a position-adjustable jig B so that the position-adjustable jig B is fixed by the jig-position-fixing unit 200. Therefore, the present invention is applied to various working processes in which a jig A is used, such that it is possible to reduce time required to fix the jig A to the existing predetermined position to produce products with higher quality and perform an operation, and as a result, it is possible to prevent a loss of labor productivity, thereby ensuring and improving productivity of the products.

3 Claims, 4 Drawing Sheets

(58) Field of Classification Search
CPC .... B62D 65/02; B62D 65/022; B62D 65/024; B62D 65/026
See application file for complete search history.

(56) References Cited

U.S. PATENT DOCUMENTS

| | | | |
|---|---|---|---|
| 5,014,405 A * | 5/1991 | Yamana | B23P 19/001 29/33 R |
| 6,113,087 A * | 9/2000 | Taylor | B62D 65/02 269/289 R |
| 6,367,788 B1 * | 4/2002 | Babchuk | B23K 37/0443 269/45 |

FOREIGN PATENT DOCUMENTS

| KR | 10-2006-0105126 A | 10/2006 |
|---|---|---|
| KR | 10-2009-0062930 A | 6/2009 |
| KR | 10-0921119 B1 | 10/2009 |

* cited by examiner

FIXING DEVICE FOR POSITION-ADJUSTING JIG

TECHNICAL FIELD

The present invention relates to a fixing device for a position-adjusting jig, and more particularly, to a fixing device for a position-adjusting jig, which couples a driving cylinder, a jig-position-fixing unit, a guide block, and a position-fixing bracket to the position-adjusting jig to fix the position-adjusting jig in order to apply and substitute a position adjustable jig for the existing fixing jig used in various processes, thereby improving accuracy and efficiency of a working process.

BACKGROUND ART

A jig A is a kind of auxiliary tool used to fix various types of components and workpieces when the components and the workpieces are machined or processed, and in general, the jig A is a kind of installing tool used to manufacture mass-produced products and components having compatibility while accurately installing and fixing the components and forcibly guiding a blade or a tool.

That is, the jig A refers to a special tool which attaches a workpiece or is attached to the workpiece, positions a part to be machined, and guides the machining process.

A main object of the jig A is to quickly and precisely restrict a position of a workpiece so that the workpiece is placed always at a predetermined position regardless of skill of an operator, prevent deformation caused by a weight of the workpiece, a resultant tool force of the corresponding tools, parallel components of force, and the like, and fix the workpiece so that the workpiece may be maintained at the predetermined position even though any external force is applied to the workpiece, thereby enabling the produced products to be in a predetermined limitation.

However, recently, various types of jigs A are widely used by virtue of advancement in machining method and rationalization in production method, but in the case of the jig A for fixing products, it is difficult to produce a number of products with high quality because the jig A is inevitably fixed at a position corresponding to an average value in an error range even in a case in which a position of the jig A needs to be changed in accordance with properties of the working process in order to produce the products with high quality.

In addition, there is no method capable of fixing a moving position-adjustable jig B even though the position-adjustable jig B is applied to the working process, and as a result, it is impossible to apply the position-adjustable jig B or it is difficult to produce the product with high quality if the position-adjustable jig B is not fixed even though the position-adjustable jig B is applied.

Therefore, the jig A is of course be used for the respective working processes in order to continuously produce the products or produce a number of products, but because of the aforementioned problems, efficient production cannot be ensured.

Therefore, as the related art in respect to a fixing device for a position-adjusting jig according to an exemplary embodiment of the present invention, the "jig device for a spot welder" disclosed in Korean Patent No. 10-0755822 is provided to be quickly and conveniently replaced when the jig device is abraded, as illustrated in FIG. 6, by standardizing guide support holes formed in a fixing member and a moving member in order to accurately fix a material supplied to be subjected to spot welding, in which to this end, a mounting piece is integrally formed between a support portion and a shaft pin of the moving member and the fixing member, a coupling groove and a bolt hole are formed to be coupled to the mounting piece, a moving supporter, which has protruding portions so as to be guided by guide pieces, is coupled and fastened to the mounting piece by a bolt, and a fixing supporter, which has the guide pieces at both sides thereof in order to guide the coupling groove and the bolt hole to be coupled to the mounting piece and guide the protruding portions, is coupled and fastened to the mounting piece by a bolt, such that when the moving supporter and the fixing supporter, which constitute a guide supporter of the jig device for the spot welder, are abraded, the moving supporter and the fixing supporter are simply replaced by loosening the bolts, and as a result, the moving supporter and the fixing supporter may be easily replaced by any one, and the replacement may be quickly and conveniently performed, thereby improving productivity by improving workability, and it is possible to improve reliability of the jig device because it is possible to accurately and stably hold and weld a product material because of the standardization even though separate adjustment is not performed after the replacement.

However, the "jig device for a spot welder" in the related art is a basically fixed jig A, and may be used when performing spot welding on a workpiece having a comparatively simple shape, but there is a problem in that it is difficult to apply the "jig device for a spot welder" when performing spot welding on a difficult product like a vehicle production process like the exemplary embodiment of the present invention.

In addition, since the jig A is fixed to perform the spot welding as described above, it is impossible to perform a difficult working process if a position of the jig A is inevitably moved.

DOCUMENT OF RELATED ART (Patent Document 0001) Korean Patent No. 10-0755822 (Aug. 30, 2007)

DISCLOSURE

Technical Problem

The present invention has been made in an effort to solve the aforementioned problems, and an object of the present invention is to provide a fixing device for fixing a position-adjustable jig B, in which the fixing device for the position-adjusting jig is configured to produce products by fixing the position-adjustable jig B at a more exact position and substituting and applying the position-adjustable jig B for the existing fixed jig A, thereby solving a problem in that the position-adjustable jig B could not be applied to various industrial fields.

Another object of the present invention is to reduce a defect and obtain a product with high quality even in a difficult working process by applying a position-adjustable jig B to various industrial fields, such that it is possible to prevent time required to fix the jig A and a loss of labor productivity, and it is possible to apply the position-adjustable jig B to a working process in order to cope with an error of a product.

Technical Solution

To achieve the aforementioned objects, the present invention provides a fixing device for a position-adjusting jig, the fixing device including: a driving cylinder which includes a piston having a predetermined stroke; a jig-position-fixing unit which is coupled to the piston of the driving cylinder; a guide block which fixes and assists the jig-position-fixing unit operated by the stroke of the piston of the driving cylinder; and a position-fixing bracket which is coupled to a position-adjustable jig so that the corresponding position-adjustable jig is fixed by the jig-position-fixing unit.

In this case, the jig-position-fixing unit may further include: first and second stoppers which come into contact with a partial surface of the position-fixing bracket; a first spring which is coupled to the first stopper; a second spring which is coupled to the second stopper; and a power transmission member into which the first and second stoppers are inserted and which is coupled to the piston of the driving cylinder and transmits power of the driving cylinder to the first and second stoppers.

In addition, the guide block may further include: a first stopper hole into which the first stopper is inserted; a second stopper hole into which the second stopper is inserted; and a fixing unit which fixes the guide block, the position-fixing bracket may be formed in a trapezoidal shape so that the first and second stoppers come into contact with an outer surface of the position-fixing bracket, or the position-fixing bracket may be formed in a concave-convex shape so that the first and second stoppers come into contact with an inner surface of the position-fixing bracket, and a coupling portion may be formed to fix the position-adjustable jig.

Terms or words used in the specification and the claims should not be interpreted as a general and dictionary meaning and should be interpreted as a meaning and a concept which conform to the technical spirit of the present invention based on a principle that an inventor can appropriately define a concept of a term in order to describe his/her own invention by the best method.

Therefore, the exemplary embodiments disclosed in the present specification and the configurations illustrated in the drawings are just the best preferred exemplary embodiments of the present invention and do not fully represent the technical spirit of the present invention. Accordingly, it should be appreciated that various equivalents and modified examples capable of substituting them can be made.

Advantageous Effects

According to the fixing device for the position-adjusting jig according to the present invention as described above with reference to the configuration and the operation, it is possible to maximize efficiency of a working process by preventing time required to fix the jig A one by one and a loss of labor productivity by enabling the position-adjustable jig B to be applied to a working process in which the fixing jig A is inevitably used in various industrial fields.

In addition, in comparison with the fixing jig A which cannot cope with an error of a product, the position-adjustable jig B according to the present invention, which may cope with an error of a product, may be applied to a working process, such that a defect of the product may be reduced and the product with high quality may be obtained, thereby improving reliability of the product.

Furthermore, it is possible to reduce a working time consumed to fix the existing fixing jig A corresponding to a product as described above, such that a more efficient operation may be performed when performing an actual operation, and a complicated and difficult operation may be simplified, and as a result, it is possible to improve economic feasibility and enable an unskilled operator to sufficiently perform an operation which has been performed only by a relatively skilled operator. Therefore, the invention is a very effective invention capable of improving productivity, ensuring quality, maintaining compatibility, and reducing working process costs.

DESCRIPTION OF MAIN REFERENCE NUMERALS OF DRAWINGS

Figure 1:
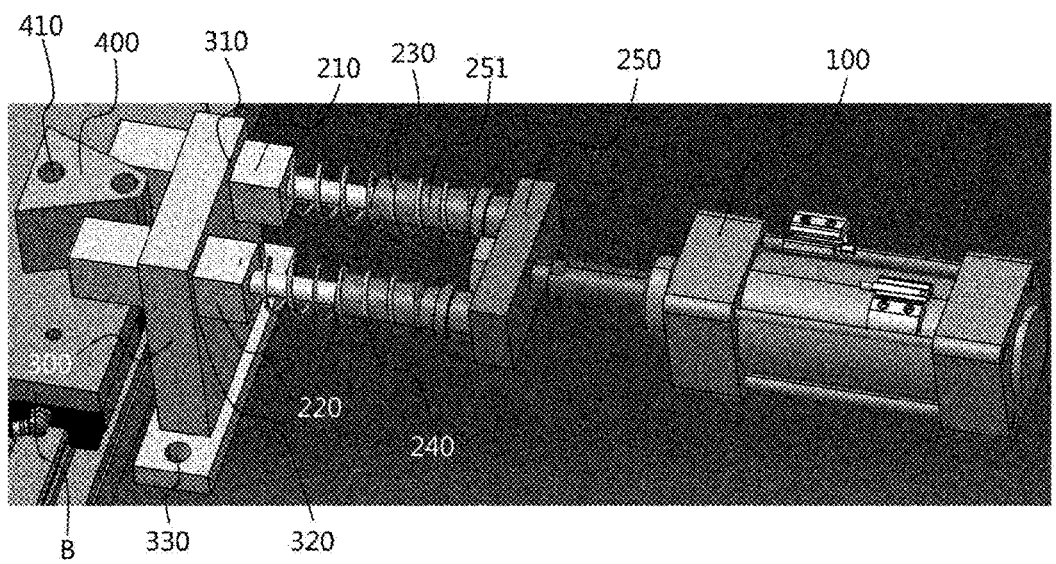
FIG. 1 is a perspective view illustrating a state of a fixing device for a position-adjusting jig according to the present invention.

1: Fixing device for position-adjusting jig
100: Driving cylinder
200: Jig-position-fixing unit
210: First stopper
220: Second stopper
230: First spring
240: Second spring
250: Power transmission member
251: Protruding portion
300: Guide block
310: First stopper hole
320: Second stopper hole
330: Fixing unit
400: Position-fixing bracket
410: Coupling portion
A: Fixing jig before fixing device for position-adjusting jig is applied
B: Position-adjustable jig to which fixing device for position-adjusting jig is applied
F: Vehicle frame
H: Vehicle door hinge

MODES OF THE INVENTION

Hereinafter, a configuration and an operation of a fixing device for a position-adjusting jig according to the present invention will be described in detail with reference to the accompanying drawings.

FIG. 1 is a perspective view illustrating a state of a fixing device for a position-adjusting jig according to the present invention.

A fixing device 1 for a position-adjusting jig according to the present invention includes: a driving cylinder 100 which includes a piston having a predetermined stroke; a jig-position-fixing unit 200 which is coupled to the piston of the driving cylinder 100; a guide block 300 which fixes and assists the jig-position-fixing unit 200 operated by the stroke of the piston of the driving cylinder 100; and a position-fixing bracket 400 which is coupled to a position-adjustable jig B so that the position-adjustable jig B is fixed by the jig-position-fixing unit 200.

The driving cylinder 100, which is coupled to constituent elements of the present invention, which are fixed at predetermined positions in a working stage including the position-adjustable jig B and will be described below, and transmits power to the constituent elements, may be operated by various methods such as hydraulic pressure, pneumatic pressure (compressed air), or a supply of electricity in accordance with a working process or an environment of a working site.

The jig-position-fixing unit 200 includes: first and second stoppers 210 and 220 which come into contact with a partial surface of the position-fixing bracket 400; a first spring 230 which is coupled to the first stopper 210; a second spring 240 which is coupled to the second stopper 220; and a power transmission member 250 into which the first and second stoppers 210 and 220 are inserted and which are coupled to the piston of the driving cylinder 100 and transmit power of the driving cylinder 100 to the first and second stoppers 210 and 220, the first and second stoppers 210 and 220 are inserted into protruding portions 251 of the power transmission member 250 which are formed to allow the first and second stoppers 210 and 220 to be inserted/coupled to the protruding portions 251 while maintaining a predetermined interval, and the first and second springs 230 and 240 are coupled to partial outer circumferential surfaces of the inserted first and second stoppers 210 and 220 and partial outer circumferential surfaces of the protruding portions 251.

The power transmission member 250, which is coupled to the first and second stoppers 210 and 220 and the first and second springs 230 and 240, are coupled to the piston of the driving cylinder 100 as described above, and the first and second stoppers 210 and 220 are operated in the same direction as the piston along the stroke of the piston, that is, in a direction of rectilinear motion.

As described above, the first and second stoppers 210 and 220 inserted/coupled to the power transmission member 250 also perform a predetermined operation in accordance with the motion of the power transmission member 250, and in this case, the first and second stoppers 210 and 220 come into contact with outer surfaces of the position-fixing bracket 400 having a trapezoidal shape.

That is, the position-fixing bracket 400 is fixed to a partial surface of the position-adjustable jig B, thereby fixing the existing position-adjustable jig B with frictional force between the outer surfaces of the position-fixing bracket 400 and the surfaces of the first and second stoppers 210 and 220 which are in contact with the outer surfaces of the position-fixing bracket 400.

In this case, the guide block 300 is configured to further increase and assist fixing force to the motion of the position-adjustable jig B when the first and second stoppers 210 and 220 come into contact with the position-fixing bracket 400, and the guide block 300 further includes a first stopper hole 310 into which the first stopper 210 is inserted; a second stopper hole 320 into which the second stopper 220 is inserted; and a fixing unit 330 which fixes the guide block 300.

As illustrated in FIG. 1, the first and second stoppers 210 and 220 are inserted into the first and second stoppers holes 310 and 320 of the guide block 300 which are formed at an interval equal to a predetermined interval between the first and second stoppers 210 and 220, and the first and second stoppers 210 and 220 are positioned close to the position-fixing bracket 400 and fixed in the working stage including the position-adjustable jig B through the fixing unit 330.

The first and second stoppers 210 and 220 and the guide block 300 are made of a material such as steel, stainless steel, an aluminum alloy, and a titanium alloy having high strength, thereby fixing the motion of the position-adjustable jig B and withstanding a load and force transmitted to the position-adjustable jig B due to various operations in the working process after the motion of the position-adjustable jig B is fixed.

Figures 4A, 4B:
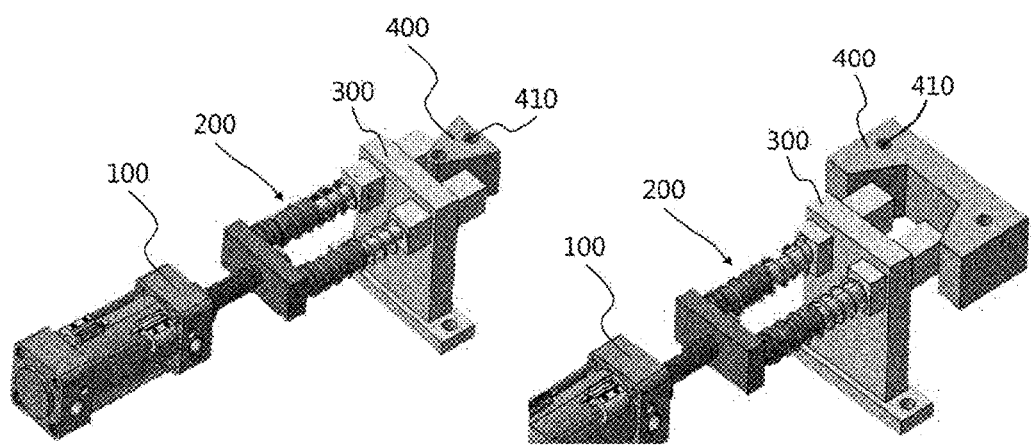
FIG. 4 is a view illustrating an exemplary embodiment of a position-fixing bracket among constituent elements of the fixing device for the position-adjusting jig according to the present invention.

In contrast, as illustrated in FIGS. 4A and 4B, the position-fixing bracket 400 is formed in a trapezoidal shape so that the first and second stoppers 210 and 220 come into contact with outer surfaces of the position-fixing bracket 400 or the position-fixing bracket 400 is formed in a concave-convex shape so that the first and second stoppers 210 and 220 come into contact with inner surfaces of the position-fixing bracket 400, and coupling portions 410 may be formed to be fixed to the corresponding position-adjustable jig B.

Figure 5:
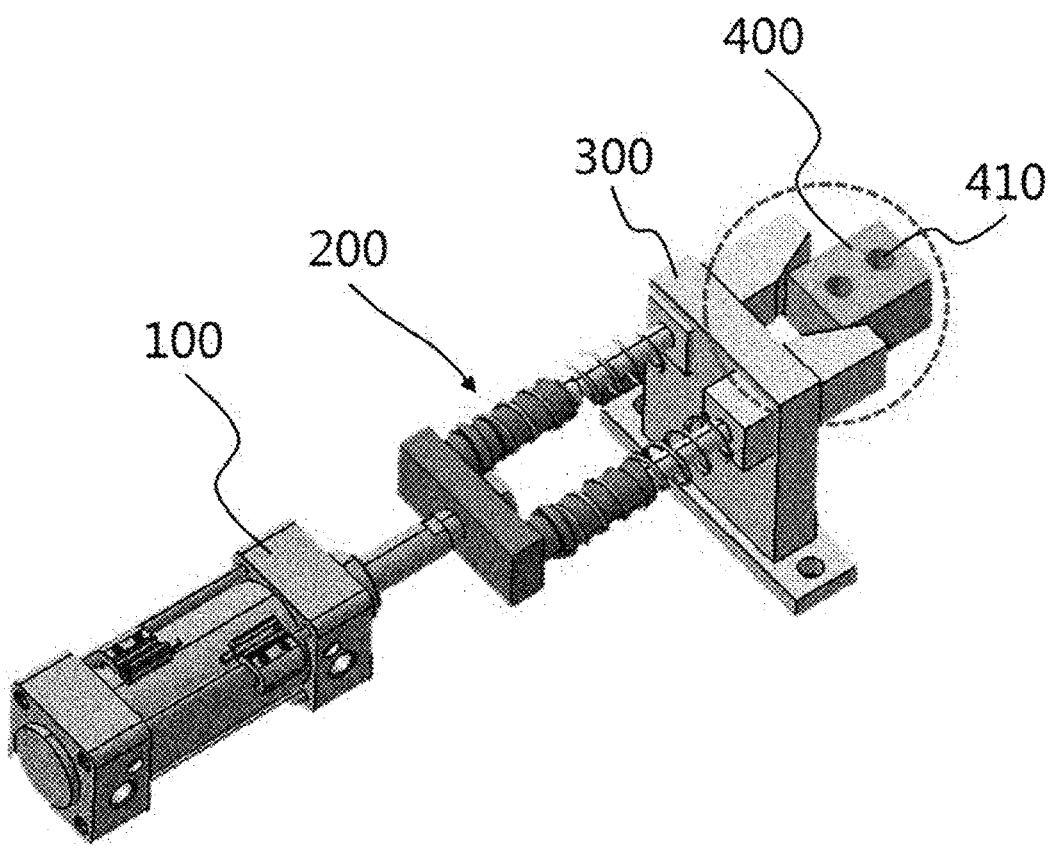
FIG. 5 is a view illustrating an exemplary embodiment of first and second stoppers and a position-fixing bracket corresponding to the first and second stoppers among the constituent elements of the fixing device for the position-adjusting jig according to the present invention.
Figure 6:
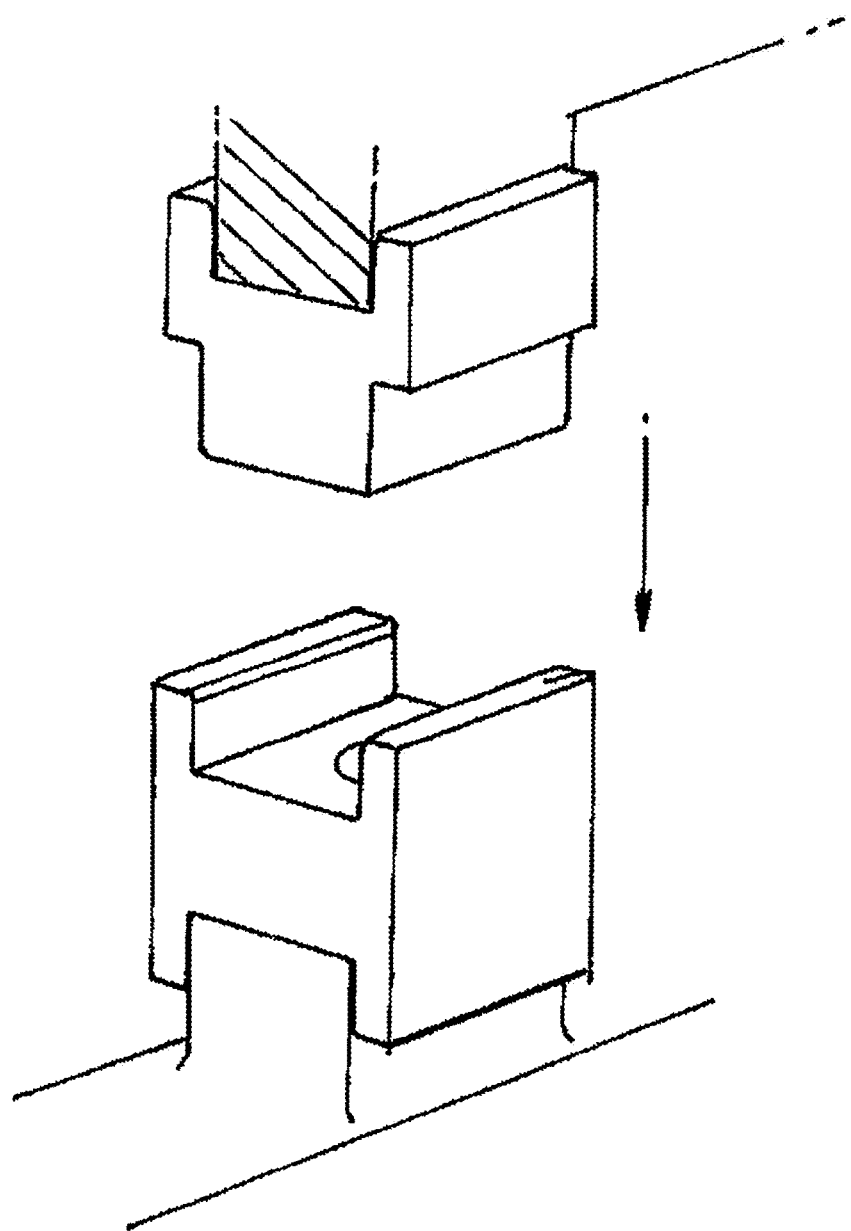
FIG. 6 is a representative view of the related art in respect to the fixing device for the position-adjusting jig according to the present invention.

In addition, for example, as illustrated in FIG. 5, end portions of the first and second stoppers 210 and 220 may be formed in a trapezoidal shape and the position-fixing bracket 400 may be formed in a quadrangular shape within a range in which the partial surfaces of the first and second stoppers 210 and 220 and the partial surface of the position-fixing bracket 400 may be in contact with one another and fixed by surface-to-surface contact or line-to-line contact.

The working process to which the present invention is applied is not limited, and particularly, the present invention solves the problem in that it is impossible to produce products with high quality due to errors occurring during the working process when producing products by coupling various constituent elements like processes of manufacturing vehicles and manufacturing aircrafts, thereby assisting in producing more precise products.

Figure 2A:
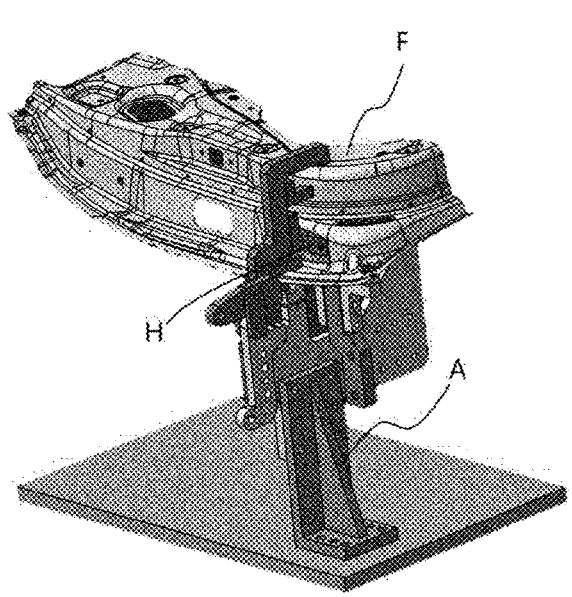
FIG. 2 is a view illustrating an exemplary embodiment of the position-adjustable jig on which the fixing device for the position-adjusting jig according to the present invention is mounted.
Figure 2B:
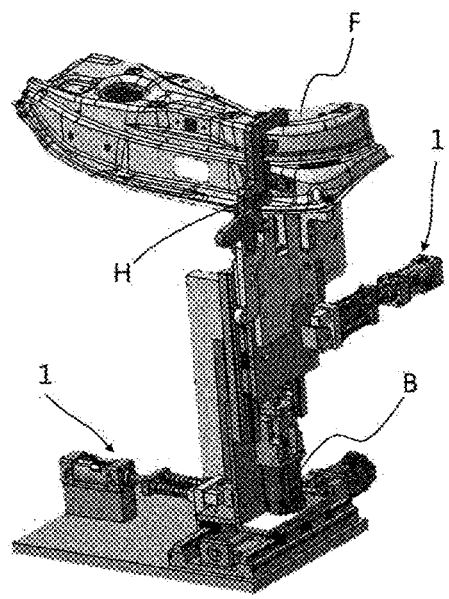

For example, FIG. 2 illustrates a jig A for spot-welding a vehicle frame and a vehicle door hinge, and FIG. 2A illustrates an exemplary embodiment in which the fixing jig A, which cannot be applied because there is no method capable of fixing the position-adjustable jig B during an operation after adjusting a position even though the position-adjustable jig B needs to be applied, is changed to the position-adjustable jig B and then applied by the present invention as illustrated in FIG. 2B.

As described above, the spot welding causes intense heat and high force, and as a result, the jig A is used up to now as the fixing jig A fixed to the working stage, as illustrated in FIG. 2A, because there is a great risk if the position-adjustable jig B is fixed only by a motor itself.

Therefore, because a position of the existing fixing jig A is adjusted by feeling of an operator having a high degree of skill by adjusting a bolt or a nut while directly using a tool such as a spanner or a wrench, a large amount of working time is required, and for these various reasons, the jig A is fixed at an inaccurate position even though the position of the fixing jig A is determined by feeling of a skilled operator having a long-time experience, and because of the inaccurate position of the jig (BIG), the product fixed to the jig A is also positioned inaccurately, and as a result, quality and productivity severely deteriorate.

In addition, as described above, significantly high pressure is applied to the jig A during the spot welding, such that the corresponding position-adjustable jig B cannot be fixed only by the motor itself even though the position-adjustable jig B is applied, and as a result, positions of the vehicle frame and the vehicle door hinge are misaligned due to the high pressure.

Therefore, the product material is fixed in a misaligned state, and welding is performed on a predetermined position in this state, such that defective products are consequently produced, and as a result, there is a problem in that reliability of the produced products deteriorates.

Therefore, according to the present invention, the fixing device for fixing the position-adjustable jig B is applied, data are made from position values of the position-adjustable jig B with respect to the motor, and the fixing device is controlled by a control unit during the corresponding working process, such that the position-adjustable jig B is positioned based on more accurate numerical values by the control unit without fixing the position of the corresponding position-adjustable jig B one by one by an operator having a high degree of skill, and the corresponding position-adjustable jig B is fixed by the fixing device for the position-adjusting jig according to the present invention, and as a result, position accuracy is improved, time required for the working process is shortened, and products with high quality are consequently manufactured with high productivity.

Figure 3A:
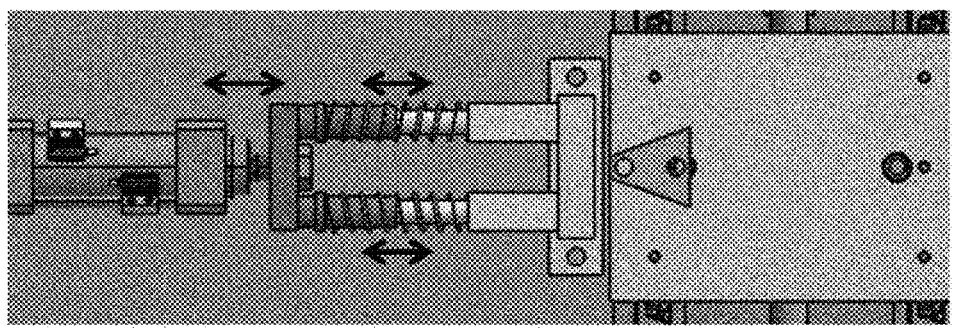
FIG. 3 is a view illustrating an exemplary embodiment of an operation of the fixing device for the position-adjusting jig according to the present invention.
Figure 3B:
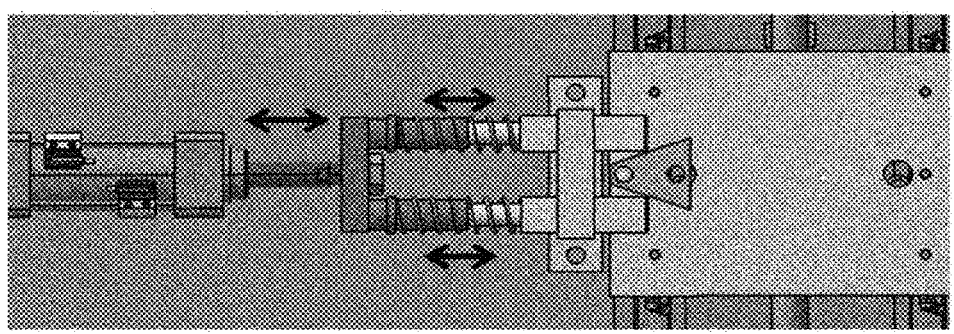
Figure 3C:
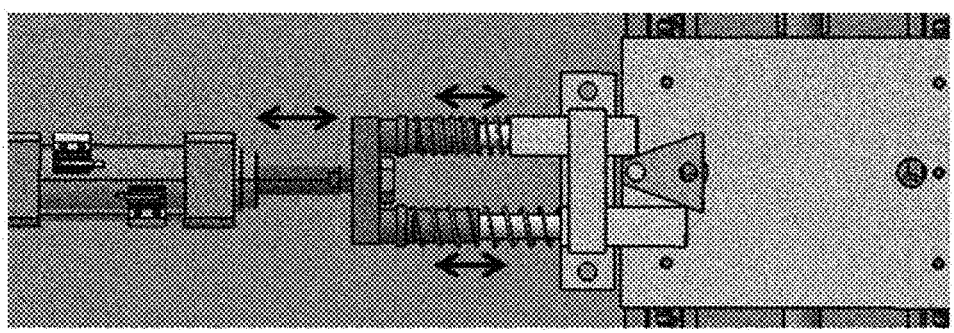

FIG. 3 illustrates an exemplary embodiment of an operation of the fixing device for the position-adjusting jig of the present invention, the first and second stoppers 210 and 220 are moved rearward so that the position-adjustable jig B may be moved as illustrated in FIG. 3A, and the first and second stoppers 210 and 220 are moved forward to fix the corresponding jig B of which the position is adjusted, as illustrated in FIG. 3B or 3C.

As illustrated in FIGS. 3B and 3C, the first and second springs 230 and 240 enable the first and second stoppers 210 and 220 and the position-fixing bracket 400 to be freely fixed within a range of an error of the product fixed to the corresponding jig B.

That is, the first and second stoppers 210 and 220, which are completely fixed to the power transmission member 250 without the first and second springs 230 and 240, cannot completely fix the position-fixing bracket 400 coupled to the corresponding jig B that moves in accordance with an error of the product.

For reference, in the exemplary embodiment of the present invention, the error is in a range from micrometers (μm) to millimeters (mm) equal to a range of a tolerance applied to general machining and coupling, but a defect of the product or a problem with safety of the product may occur due to accumulation of errors occurring during the respective working processes in the case of the complicated products made by coupling many constituent elements.

Finally, the present invention may be variously applied in accordance with properties of the working processes. For example, in the case of an operation of fixing and controlling the position-adjustable jig B only in a single axis, the fixing device for the position-adjusting jig according to the present invention is installed in a direction identical to an axial direction to be controlled, thereby fixing the single axis, and in the case of an operation of fixing and controlling multiple axes as necessary, the present invention is installed in directions identical to the respective axial directions, thereby fixing the multiple axes.

That is, as illustrated in FIG. 2B, several axes may be fixed.

As a result, it is possible to provide compatibility of the products by uniformly maintaining precision of the products produced according to the present invention, produce many products with high quality, and reduce costs.

In addition, the operation may be easily performed even by an unskilled operator, a mental burden of the operator may be reduced, an unexpected accident may be prevented, and a loss such as a machining defect may be prevented.

It is obvious to those skilled in the art that the present invention is not limited to the aforementioned exemplary embodiments, and may be variously changed and modified without departing from the spirit and the scope of the present invention. Therefore, since the present invention may be implemented in various different forms without departing from the technical spirit or the main features, it should be appreciated that all of the exemplary embodiments of the present invention are just illustrative, but not limitative.

INDUSTRIAL APPLICABILITY

The jig is used for various purposes in various working processes.

The jig A quickly and precisely restricts a position of a workpiece so that the workpiece is placed always at a predetermined position regardless of skill of an operator, prevents deformation caused by a weight of the workpiece, a resultant tool force of the corresponding tools, parallel components of force, and the like, and fixes the workpiece so that the workpiece may be maintained at the predetermined position even though any external force is applied to the workpiece, thereby enabling the produced products to be in a predetermined limitation.

Therefore, according to the fixing device for the position-adjusting jig according to the present invention, the fixing device for the position-adjustable jig is provided by enabling the jig, which is different from the existing fixing jig and configured to adjust a position thereof, to industrial sites, such that the existing working process may be more effectively performed, and accuracy and productivity of the product may be improved, and as a result, it is possible to apply the fixing device to improve various industrial fields such as businesses of manufacturing the jig and using the jig.

The invention claimed is:

1. A fixing device for a position-adjusting jig, the fixing device comprising:
   a driving cylinder which includes a piston having a predetermined stroke;
   a jig-position-fixing unit which is coupled to the piston of the driving cylinder;
   a guide block which fixes and assists the jig-position-fixing unit operated by the stroke of the piston of the driving cylinder; and
   a position-fixing bracket which is coupled to a position-adjustable jig so that the corresponding position-adjustable jig is fixed by the jig-position-fixing unit,
   wherein the jig-position-fixing unit further includes:
   first and second stoppers which come into contact with a partial surface of the position-fixing bracket;
   a first spring which is coupled to the first stopper;
   a second spring which is coupled to the second stopper; and
   a power transmission member into which the first and second stoppers are inserted and which is coupled to the piston of the driving cylinder and transmits power of the driving cylinder to the first and second stoppers, and the first and second stoppers are operated by the stroke of the piston of the driving cylinder and come into contact with an outer circumferential surface of the position-fixing bracket, such that the position-adjustable jig to which the position-fixing bracket is coupled is fixed.

2. The fixing device of claim 1, wherein the guide block further includes:
   a first stopper hole into which the first stopper is inserted;
   a second stopper hole into which the second stopper is inserted; and
   a fixing unit which fixes the guide block.

3. The fixing device of claim 1, wherein the position-fixing bracket is formed in a trapezoidal shape so that the first and second stoppers come into contact with an outer surface of the position-fixing bracket, or the position-fixing bracket is formed in a concave-convex shape so that the first and second stoppers come into contact with an inner surface of the position-fixing bracket, and a coupling portion is formed to fix the position-adjustable jig.

\* \* \* \* \*